United States Patent
Volz et al.

(10) Patent No.: US 6,386,174 B1
(45) Date of Patent: May 14, 2002

(54) METHOD FOR OPERATING AN INTERNAL COMBUSTION ENGINE

(75) Inventors: Dieter Volz, Heilbronn; Ernst Wild, Oberriexingen; Manfred Pfitz, Vaihingen; Werner Mezger, Eberstadt; Juergen Pantring, Schwieberdingen; Kristina Eberle, Hardthof; Roland Herynek, Oetisheim; Detlef Heinrich, Ludwigsburg; Mirjam Steger, Vaihingen; Gudrun Menrad; Lutz Reuschenbach, both of Stuttgart; Michael Oder, Illingen; Werner Hess, Stuttgart; Georg Mallebrein, Korntal-Muenchingen; Christian Koehler, Erligheim, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/603,960

(22) Filed: Jun. 26, 2000

(30) Foreign Application Priority Data

Jun. 24, 1999 (DE) .......................................... 199 28 825

(51) Int. Cl.$^7$ ............................................... F02B 17/00
(52) U.S. Cl. ........................ 123/295; 123/430; 123/358
(58) Field of Search ................................. 123/295, 305, 123/430, 358, 361, 352, 339.12

(56) References Cited

U.S. PATENT DOCUMENTS

| | | | | | |
|---|---|---|---|---|---|
| 5,755,198 A | * | 5/1998 | Grob et al. | ................. | 123/295 |
| 5,947,079 A | * | 9/1999 | Sivashankar et al. | ........ | 123/295 |
| 6,006,724 A | * | 12/1999 | Takahashi et al. | ..... | 123/339.19 |
| 6,026,779 A | * | 2/2000 | Obata et al. | ................. | 123/295 |
| 6,055,476 A | * | 4/2000 | Yoshino | ..................... | 701/110 |
| 6,062,191 A | * | 5/2000 | Ooba | ......................... | 123/295 |
| 6,065,443 A | * | 5/2000 | Mizuno et al. | ............. | 123/295 |
| 6,089,206 A | * | 7/2000 | Suzuki et al. | ............... | 123/295 |
| 6,092,507 A | * | 7/2000 | Bauer et al. | ................ | 123/430 |
| 6,142,117 A | * | 11/2000 | Hori et al. | .................. | 123/295 |
| 6,240,895 B1 | * | 6/2001 | Oder | .......................... | 123/295 |

* cited by examiner

Primary Examiner—Willis R. Wolfe
Assistant Examiner—Mahmoud Gimie
(74) Attorney, Agent, or Firm—Walter Ottesen

(57) ABSTRACT

The invention is directed to an internal combustion engine, especially for a motor vehicle. The engine has a combustion chamber into which fuel can be injected in at least two operating modes. A control apparatus is provided with which a switchover between the operating modes can be effected. A desired value (rlmd$s) can be determined with the control apparatus for the air charge in the combustion chamber. The desired value (rlmd$s) defines a maximum value for the air charge in the combustion chamber which is not exceeded.

18 Claims, 2 Drawing Sheets

METHOD FOR OPERATING AN INTERNAL COMBUSTION ENGINE

FIELD OF THE INVENTION

The invention relates to a method for operating an internal combustion engine and especially of a motor vehicle wherein the fuel is infected into a combustion chamber in at least two operating modes and wherein there can be a switching between the two operating modes. Likewise, the invention relates to an internal combustion engine especially for a motor vehicle wherein fuel can be injected into a combustion chamber in at least two operating modes. The engine has a control apparatus with which a switchover between the modes of operation can be effected.

BACKGROUND OF THE INVENTION

A method of this kind and an engine of this kind are known, for example, from a so-called gasoline direct injection. There, fuel is injected into the combustion chamber of the engine in a homogeneous operation during the induction phase or in a stratified operation during the compression phase. The homogeneous operation is preferably provided for the full-load operation of the engine; whereas, the stratified operation is suitable for the idle operation or part-load operation. In such a direct injecting engine, a switchover is made between the above-mentioned modes of operation, for example, in dependence upon the requested torque.

The different modes of operation of the engine place different requirements on the control (open-loop and/or closed-loop) of a throttle flap arranged in the intake manifold. Accordingly, it is, for example, advantageous that the throttle flap is opened as wide as possible in stratified operation in order to reduce the fuel consumption as much as possible. However, it must be avoided that specific functions of the engine no longer function because of a throttle flap which is open too wide because of the occurring pressure conditions. Such specific functions are, for example, an exhaust-gas recirculation or a tank venting.

In homogeneous operation, a constant air/fuel ratio is run, that is, $\lambda=1$. There, a fixed ratio is present between the fuel quantity and the air quantity which is controlled (open-loop and/or closed-loop) via the throttle flap. In the stratified operation, lambda should have a lowest value above 1 because of exhaust-gas reasons. From this, a minimum opening of the throttle flap results. On the other hand, a certain throttling should make possible the above-mentioned other functions. From this, a maximum lambda value results.

SUMMARY OF THE INVENTION

It is an object of the invention to provide a method for operating an internal combustion engine with which the least possible consumption of fuel is attainable with a low development of toxic substances without other functions of the engine being hereby disadvantageously affected.

The method of the invention is for operating an internal combustion engine including an engine for a motor vehicle. The method includes the steps of: injecting fuel into the combustion chamber in at least two operating modes and switching between the operating modes; determining a desired value (rlmd$s) for the air charge in the combustion chamber with the desired value (rlmd$s) defining a maximum value for the air charge in the combustion chamber which may not be exceeded.

In an advantageous embodiment of the invention, a desired value is determined for the maximum permissible air charge of the combustion chamber in dependence upon functions of the engine, for example, in dependence upon an exhaust-gas recirculation and/or a tank venting and/or the like. This desired value defines that desired value for the air charge which is maximally permissible based on the functions of the engine. In this way, it is ensured that none of the functions of the engine becomes inoperable because of a throttle flap which is opened too wide.

In an advantageous further embodiment of the invention, a minimum value selection is carried out on which the desired value for the air charge in the combustion chamber, which is required for the generation of the torque requested from the engine, and the desired value for the maximum permissible air charge of the combustion chamber participate. In this way, the lesser of the two desired values is selected. In this way, it is ensured that lambda in homogeneous operation does not become greater than one.

In an advantageous embodiment of the invention, a desired value for the air charge in the combustion chamber is determined. The desired value defines a minimum value for the air charge in the combustion chamber beneath which the air charge does not drop.

The desired value is preferably that desired value for the air charge which is at least required for generating a combustion in the combustion chamber. In this way, it is ensured that the air charge in the combustion chamber is, in each case, so great that a combustion of the fuel, which is injected into the combustion chamber, reliably takes place. Defective ignitions or the like are thereby avoided.

In a further advantageous embodiment of the invention, a maximum value selection is carried out in which the desired value for the air charge participates. This desired value is the least required for generating a combustion in the combustion chamber. In this way, it is ensured that, in no event, will there be a drop below the air charge in the combustion chamber which is required for generating a combustion.

In further advantageous embodiments of the invention, the desired value for the air charge is determined in dependence upon the mode of operation of the engine and/or an opening of the throttle flap is requested by each of the functions of the engine. The desired value is determined in dependence upon the smallest opening.

It is especially advantageous when a minimum value selection is executed on which the throttling, which is requested by the functions, participates. In this way, that throttling is determined which may be maximally present so that all participating functions of the engine function reliably.

Of special significance is the realization of the method of the invention in the form of a control element which is provided for a control apparatus of an internal combustion engine, especially of a motor vehicle. A program is stored on the control element which can be run on a computing apparatus such as a microprocessor and is suitable for carrying out the method of the invention. In this case, the invention is therefore realized by a program stored on the control element so that this control element, which is provided with the program, defines the invention in the same manner as the method for the execution of which the program is suitable. As a control element, especially an electrical storage medium can be applied such as a read-only-memory.

Additional features, possibilities of application and advantages of the invention result from the description of the embodiments of the invention which follows. The embodiments are shown in the figures of the drawing. All described or illustrated features define the invention by themselves or in any desired combination independently of their composition in the patent claims or their dependency as well as independently of their formulation or description in the disclosure and/or drawings.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
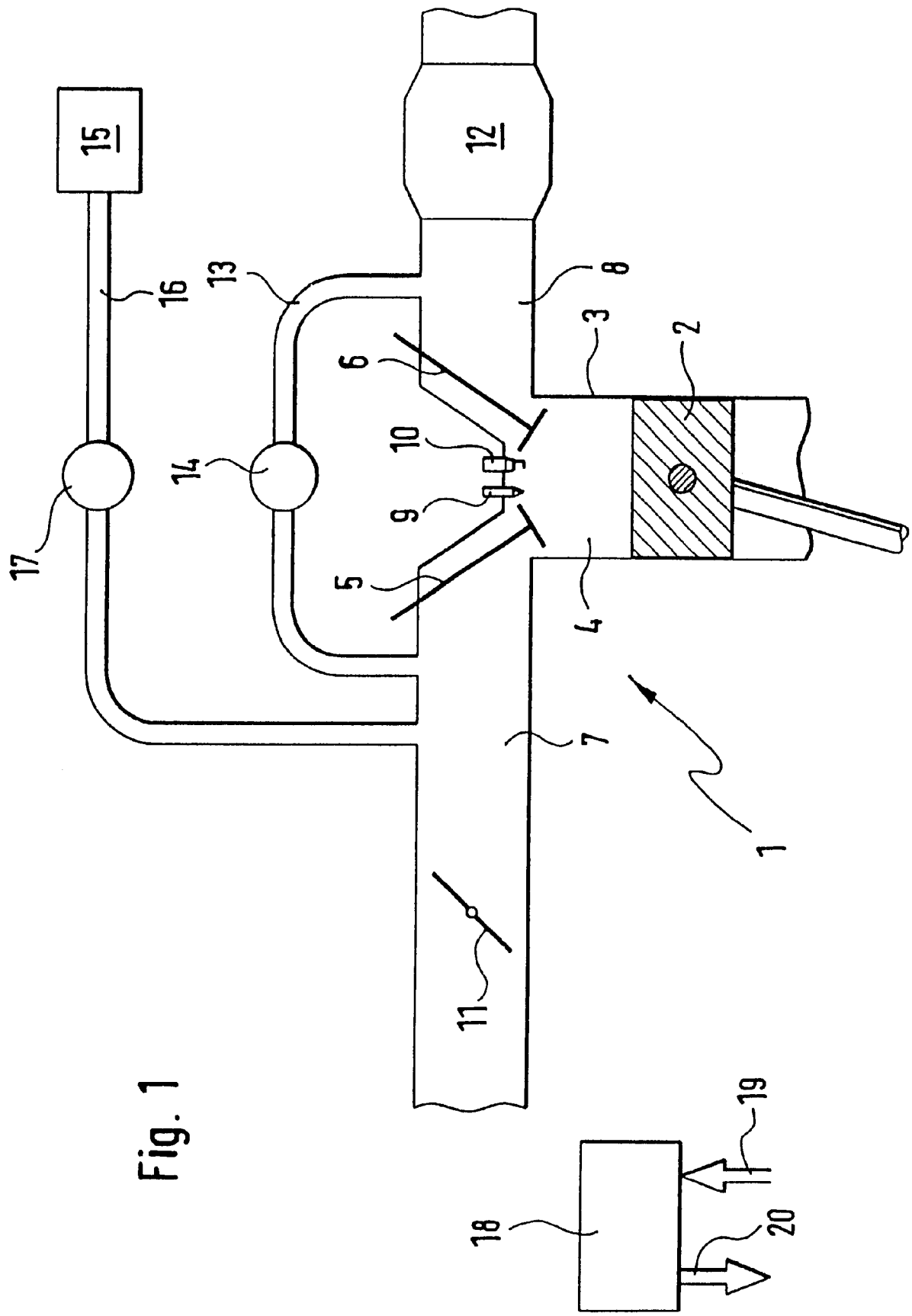
FIG. 1 is a schematic block circuit diagram of an embodiment of the internal combustion engine according to the invention; and, FIG. 2 shows a schematic block circuit diagram of an embodiment of the method of the invention for operating the engine of FIG. 1.

In FIG. 1, an internal combustion engine 1 of a motor vehicle is shown wherein a piston 2 is movable back and forth in a cylinder 3. The cylinder 3 is provided with a combustion chamber 4 which is delimited, inter alia, by the piston 2, an inlet valve 5 and an outlet valve G. An intake manifold 7 is coupled to the inlet valve 5 and an exhaust-gas pipe 8 is coupled to the outlet valve 6.

An injection valve 9 and a spark plug 10 extend into the combustion chamber 4 in the region of the inlet valve 5 and the outlet valve 6. Fuel can be injected into the combustion chamber 4 via the injection valve 9. The fuel in the combustion chamber 4 can be ignited with the spark plug 10.

A rotatable throttle flap 11 is mounted in the intake manifold 7 and air can be supplied to the intake manifold 7 via this throttle flap. The quantity of the supplied air is dependent upon the angular position of the throttle flap 11. A catalytic converter 12 is mounted in the exhaust-gas pipe 8 and functions to clean the exhaust gas arising because of the combustion of the fuel.

An exhaust-gas recirculation pipe 13 leads back to the intake manifold 7 from the exhaust-gas pipe 8. An exhaust-gas recirculation valve 14 is mounted in the exhaust-gas recirculation pipe 13. The quantity of the exhaust gas recirculated into the intake manifold 7 is adjusted by the valve 14. The exhaust-gas recirculation pipe 13 and the exhaust-gas recirculation valve 14 conjointly define a so-called exhaust-gas recirculation system (EGR).

A tank-venting line 16 leads from the fuel tank 15 to the intake manifold 7. A tank-venting valve 17 is mounted in the tank-venting line 16. With the valve 17, the quantity of the fuel vapor can be adjusted which is supplied to the intake manifold 7 from the fuel tank 15. The tank-venting line 16 and the tank-venting valve 17 conjointly form a so-called tank-venting system TE.

A back and forth movement is imparted to the piston 2 by the combustion of the fuel in the combustion chamber 4. This movement is transmitted to a crankshaft (not shown) and applies a torque to the crankshaft.

Input signals 19 are applied to a control apparatus 18 and these signals define operating variables of the engine 1 measured by sensors. For example, the control apparatus 18 is connected to an air mass sensor, a lambda sensor, an rpm sensor and the like. Furthermore, the control apparatus 18 is connected to an accelerator pedal sensor which generates a signal that indicates the position of an accelerator pedal, which is actuable by the driver, and therefore indicates the requested torque. The control apparatus 18 generates output signals 20 with which the performance of the engine 1 can be influenced via actuators and/or positioning devices. For example, the control apparatus 18 is connected to the injection valve 9, the spark plug 10 and the throttle flap 11 and the like and generates the signals required for driving the same.

The control apparatus 18 is, inter alia, provided to control (open-loop and/or closed-loop) the operating variables of the engine 1. For example, the fuel mass, which is injected by the injection valve 9 into the combustion chamber 4, is controlled (open-loop and/or closed-loop) by the control apparatus 18 especially to provide a reduced consumption of fuel and/or to provide a reduced generation of toxic substances. For this purpose, the control apparatus 19 is provided with a microprocessor in which a program is stored in a memory medium such as a read-only-memory. This program is suitable to carry out the above-mentioned control (open-loop and/or closed-loop).

In a first operating mode, a so-called homogeneous operation "hom" of the engine 1, the throttle flap 11 is partially opened or closed in dependence upon the desired torque. The fuel is injected into the combustion chamber 4 by the injection valve 9 during an induction phase caused by the piston 2. The injected fuel is swirled by the air inducted simultaneously via the throttle flap 11 and thereby is essentially uniformly distributed in the combustion chamber 4. Thereafter, the air/fuel mixture is compressed during the compression phase in order to then be ignited by the spark plug 10. The piston 2 is driven by the expansion of the ignited fuel. In homogeneous operation, the arising torque is, dependent, inter alia, on the position of the throttle flap 11. The air/fuel mixture is adjusted as close as possible to $\lambda=1$ to obtain a reduced generation of toxic substances.

In a second operating mode, a so-called homogeneous lean operation "hmm" of the engine 1, the fuel is injected into the combustion chamber 4 during the induction phase as in the homogeneous operation. In contrast to the homogeneous operation, the air/fuel mixture can, however, also occur with $\lambda>1$.

In a third operating mode, a so-called stratified operation "sch" of the engine 1, the throttle flap 11 is opened wide. The fuel is injected into the combustion chamber 4 by the injection valve 9 during a compression phase caused by the piston 2. This injection is spatially in the immediate vicinity of the spark plug 10 as well as at a suitable interval in time ahead of the ignition time point. Then, with the aid of the spark plug 10, the fuel is ignited so that the piston 2 is driven in the following work phase by the expansion of the ignited fuel. The resulting torque is dependent in stratified operation substantially from the injected fuel mass. Essentially, the stratified operation is provided for the idle operation and for the part-load operation of the engine 1.

In a fourth operating mode, a so-called homogeneous stratified operation "hos" of the engine 1, a double injection takes place in the same work cycle. Fuel is injected into the combustion chamber 4 by the injection valve 9 during the induction phase and during the compression phase. The homogeneous stratified operation thereby couples the characteristics of the stratified operation and the homogeneous operation. With the aid of the homogeneous-stratified operation, an especially soft transition from the stratified operation into the homogeneous operation and vice versa can be obtained.

A double injection likewise takes place in a fifth operating mode, a so-called stratified catalytic converter heating mode "skh" of the engine 1. Fuel is injected into the combustion chamber 4 by the injection valve 9 during the compression phase and during the work phase. In this way, essentially no additional torque is obtained; instead, a rapid warming of the catalytic converter 12 is effected by the fuel injected in the work phase. This is of significance especially for a cold start of the engine 1.

A switchover back and forth between the described operating modes of the engine 1 can be provided. Switchovers of this kind are executed by the control apparatus 18. The triggering of a switchover takes place via an operating state of the engine 1 or via a function of the control apparatus 18 executing the operating state. For example, for a cold start, the fifth operating mode (namely, the stratified catalytic converter heating mode) can be triggered and, with this mode, the catalytic converter 12 is heated rapidly to an operating temperature.

Figure 2:
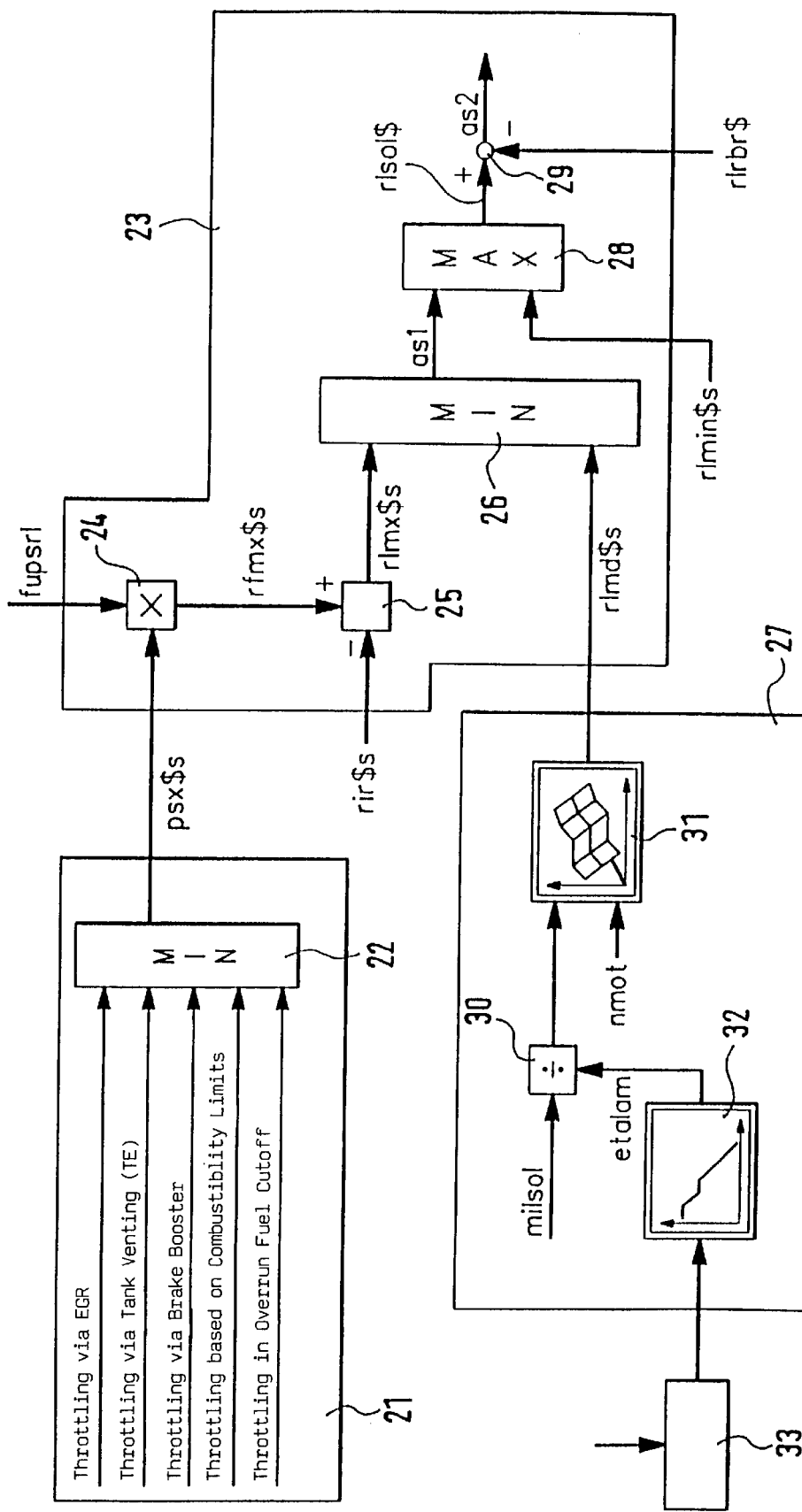

In FIG. 2, a method is shown which can be executed by the control apparatus 18 and this method is suitable to generate a signal for driving the throttle flap 11. The blocks, which are shown in FIG. 2, are represented in the control apparatus 18 by programs.

In a block 21, a minimum value selection 22 is executed from a plurality of signals and a specific function corresponds to each of the signals.

Except in homogeneous operation, it would be desirable in all operating modes to open the throttle flap 11 as wide as possible. This, however, is not always possible because of other peripheral conditions of the functions. Accordingly, it is possible that the tank venting TE does not function at all with the throttle flap fully opened because of unfavorable pressure relationships. The same can apply to the exhaust-gas recirculation (EGR).

For this reason, the above-mentioned signals are generated by the individual functions. With these signals, each function indicates the maximum permissible opening of the throttle flap 11 corresponding thereto. The signals define the position of the throttle flap 11 which is wanted by the particular function, that is, the so-called throttling requested by the functions.

The signals and the functions relate to the following: the throttling by the exhaust-gas recirculation EGR; the throttling by the tank venting TE; the throttling by a brake force amplifier BKV; the throttling based on the limits of combustion; and, the throttling for the overrun cutoff.

The individual signals can change in dependence upon the particular operating mode. Accordingly, for the exhaust-gas recirculation EGR, the throttling in the homogeneous operation deviates significantly, for example, from the throttling in the stratified operation. This leads to the situation that the individual signals and the signals derived therefrom are different in dependence upon the particular operating mode. In the following, this is characterized as an operating mode dependency and is identified by the sign "$" in the identification of the described signals.

From the above-mentioned signals, that signal is selected by the minimum value selection 22 which has the smallest value and therefore defines the smallest opening of the throttle flap 11. The less the throttle flap 11 is opened, the lower is the pressure in the intake manifold 7. The selected smallest signal thereby defines an upper limit for the pressure in the intake manifold 7. At the output of the minimum value selection 22, a signal psx$s is present which defines an operating-mode dependent desired value for the maximum permissible pressure in the intake manifold 7.

With the minimum value selection 22, it is achieved that the maximum throttling of the throttle flap 11 is considered which results from the individual functions.

The signal psx$s is supplied to a block 23 to which a signal fupsrl is also supplied which is a factor for converting the pressure in the intake manifold 7 into a charge of the combustion chamber 4. The two signals psx$s and fupsrl are multiplied by each other by a block 24 and a signal rfmx$s results which is an operating-mode dependent desired value for the maximum permissible charge of the combustion chamber 4 with air and exhaust gas.

In a next block 25, a signal rir$s is subtracted from the signal rfmx$s. The signal rir$s is an operating-mode dependent desired value for the inert gas component in the exhaust gas which is externally recirculated via the exhaust-gas recirculation EGR and the residual gas remaining in the combustion chamber 4, that is, the internal exhaust-gas recirculation. A signal rlmx$s is thereby present at the output of the block 25. This signal rlmx$s defines an operating-mode dependent desired value for the maximum permissible air charge of the combustion chamber 4.

The signal rlmx$s is supplied to a minimum value selection 26 which likewise is charged with a signal rlmd$s. The signal rlmd$s is generated by a block 27 and defines an operating-mode dependent desired value for the air charge in the combustion chamber 4. This air charge is necessary for the generation and output of the torque required from the engine 1. This desired value may not be exceeded because, otherwise, the engine 1 would exceed a maximum lambda value and thereby would be operated with a lambda which is too large.

The lesser of the two signals rlmx$s and rlmd$s is selected by the minimum value selection 26. At the output of the minimum value selection 26, either the signal rlmx$s is present when this desired value, which is dependent upon the individual functions of the engine 1, is less than the desired value, which is required for the generation of the requested torque, or the signal rlmd$s is present when the maximum lambda value is the lesser desired value. In each case, the signal rlmd$s is maximally present at the output of the minimum value selection 26.

With the minimum value selection 26, the condition is reached that in no case will the maximum air charge in the combustion chamber 4 lead to a lambda of the engine 1 which is too great. This maximum air charge results from the maximum throttling.

The output signal asl of the minimum value selection 26 is supplied to a maximum value selection 28 to which likewise a signal rlmin$s is applied which defines an operating-mode dependent desired value for the minimum required air charge in the combustion chamber 4. There may be no drop below this desired value because, otherwise, no combustion in the combustion chamber 4 can take place.

The larger of the two signals rlmin$s and asl is selected by the maximum value selection 28. Accordingly, at least the signal rlmin$s is present at the output of the maximum value selection 28.

With the maximum value selection 28, the situation is achieved that, in no case, will the air charge of the combustion chamber 4, which results from the minimum value selection 26, be so small that a combustion can no longer take place.

A signal rlsol$ is present at the output of the maximum value selection 28. This signal is the operating-mode dependent desired value for the air charge in the combustion chamber 4. This signal rlsol$ is supplied to a logic element 29 to which likewise a signal rlbr$ is supplied which is the operating-mode dependent fresh gas component in the exhaust gas recirculated via the exhaust-gas recirculation EGR and the air of the residual gas remaining in the combustion chamber 4. The logic element 29 subtracts the signal rlrbr$ from the signal rlsol$.

A signal as2 is available at the output of the logic element 29 and this signal defines that component for the air charge in the combustion chamber 4 which must be supplied via the throttle flap 11. The signal as2 is therefore suitable for driving the throttle flap 11. The signal as2 defines that position or opening of the throttle flap 11 which is necessary in order to make possible the execution of the above-mentioned functions without a non-permissible lambda being generated by the engine 1 or without a combustion in the combustion chamber 4 even being possible.

As mentioned, the signal rlmd$s is generated by the block 27. This signal rlmd$s defines, as already mentioned, an operating-mode dependent desired value for the air charge in the combustion chamber 4 which is required for generating and outputting the lambda requested from the engine 1.

A signal milsol is supplied to a block 30 in block 27. The signal milsol defines the desired value of the torque which is to be generated in view of the adjustment of the air and therefore of the throttle flap 11. In block 30, the signal milsol is divided by a numerical value etalam. The numerical value etalam defines the torque efficiency, which is dependent upon lambda, and is the reciprocal value of lambda to a first approximation.

In the following, the homogeneous operation is first viewed wherein the ratio of the air/fuel mixture, that is, lambda, is equal to "1" and wherein the numerical value etalam is likewise equal to "1", In this way, the division in the block 30 has no effect on the signal milsol in this case.

The signal milsol is inputted unchanged into a characteristic field 31 to which the engine speed nmot of the engine 1 is supplied as a further input signal. The signal rlmd$s is present at the output of the characteristic field 31 and this signal, as explained, is transmitted further to the minimum value selection 26 of the block 23.

In the characteristic field 31, the desired value for the air charge in the combustion chamber 4 is determined from the signal milsol, that is, from the torque desired value, in dependence upon the engine speed nmot. This air charge is required for generating and outputting the lambda requested from the engine 1. In the case described above, the signal rlmd$s, which is generated from the characteristic field, relates to the homogeneous operation.

If no homogeneous operation is present and instead there is a stratified operation present, for example, then lambda is, for example, equal to "2". This stratified operation as well as the other operating modes, which deviate from the homogeneous operation, are considered via a characteristic line 32 of the block 27 as well as by a block 33. However, nothing changes as to the signal milsol.

The various requests for lambda values of the various operating modes are applied to the block 33. From these requests, the block 33 generates the maximum lambda value for the particular operating mode then present and transmits this maximum lambda value to the characteristic line 32.

If it is assumed, for example, that the stratified operation is present, then, to achieve the lean air/fuel mixture for this stratified operation, an air excess must be generated in comparison to the homogeneous operation. This is effected by the characteristic line 32. With the aid of characteristic line 32, the above-mentioned numerical value etalam is generated from the maximum lambda value obtained from the block 33. This numerical value is transmitted to block 30. The signal milsol is then divided by this numerical value etalam.

If, for example, lambda equals "2", then the numerical value etalam is approximately 0.5. One then obtains by the division in block 30 a doubling of the signal milsol and therefore of the desired value for the torque to be generated. This doubled signal milsol is applied to the characteristic field 31.

The characteristic field 31 supplies the signal rlmd$s as an output quantity which would be necessary for $\lambda=1$. This output quantity is also valid for $\lambda>1$ because of the consideration of the lambda efficiency in the form of the numerical value etalam.

In the case of the stratified operation, the situation is achieved with the division by the numerical value etalam that the signal rlmd$s becomes greater. This means that the operating-mode dependent desired value for the air charge in the combustion chamber, which is required for generating and outputting the torque requested from the engine 1, becomes greater. Accordingly, more air is supplied to the combustion chamber 4. With the increased supply of air, the air/fuel mixture becomes leaner as wanted.

This signal rlmd$s defines a maximum value for the air charge in the combustion chamber 4 for the particular operating mode. This maximum value may not be exceeded because of the logic coupling in the minimum value selection 26.

It is understood that the foregoing description is that of the preferred embodiments of the invention and that various changes and modifications may be made thereto without departing from the spirit and scope of the invention as defined in the appended claims.

What is claimed is:

1. A method for operating an internal combustion engine including an engine for a motor vehicle wherein an air charge is supplied to the combustion chamber during operation of the engine, the method comprising the steps of:

injecting fuel into the combustion chamber in at least two operating modes and switching between the operating modes;

determining a desired value (rlmd$s) for the air charge in said combustion chamber with said desired value (rlmd$s) defining a maximum value for the air charge in said combustion chamber which may not be exceeded; and, determining a desired value (rlmx$s) for the maximum permissible air charge of the combustion chamber in dependence upon functions of said engine.

2. The method of claim 1, wherein said dependence is upon at least one of the following: an exhaust-gas recirculation (EGR); and, a tank venting (TE).

3. The method of claim 1, comprising the further step of determining a desired value (rlmin$s) for the air charge in said combustion chamber and said desired value (rlmin$s) defining a minimum value for the air charge in said combustion chamber below which there can be no drop.

4. The method of claim 3, wherein said desired value (rlmin$s) for the air charge is at least required for generating a combustion in said combustion chamber.

5. The method of claim 3, comprising the further step of executing a maximum value selection in which said desired value (rlmin$s) for the air charge participates.

6. The method of claim 1, comprising the further step of determining the desired value (rlmd$s) for the air charge in dependence upon the operating mode of said engine.

7. The method of claim 1, comprising the further step of determining the desired value (rlmd$s) for the air charge in dependence upon the lambda request of the particular operating mode.

8. The method of claim 1, comprising the further step of determining the desired value (rlmd$s) for the air charge with the aid of a characteristic field from a desired value (milsol) for the requested torque.

9. The method of claim 8, comprising the further step of changing said desired value (milsol) for the requested torque in dependence upon the lambda request of the particular operating mode.

10. The method of claim 2, comprising the further step of determining the desired value (rlmx$s) for the air charge in dependence upon the operating mode of said engine.

11. The method of claim 2, comprising the further step of requesting an opening of the throttle flap by each of the functions of said engine; and, determining the desired value (rlmx$s) in dependence upon the smallest one of the openings.

12. The method of claim 11, comprising the further step of executing a minimum value selection in which the throttlings, which are requested by said functions, participate.

13. The method of claim 2, comprising the further step of determining the desired value (rlmx$s) from a maximum permissible pressure (psx$s) in the intake manifold.

14. The method of claim 2, wherein an inert gas component (rir$s) is contained in said desired value (rlmx$s).

15. A method for operating an internal combustion engine including an engine for a motor vehicle wherein an air charge is supplied to the combustion chamber during operation of the engine, the method comprising the steps of:

injecting fuel into the combustion chamber in at least two operating modes and switching between the operating modes;

determining a desired value (rlmd$s) for the air charge in said combustion chamber with said desired value (rlmd$s) defining a maximum value for the air charge in said combustion chamber which may not be exceeded;

determining a desired value (rlmx$s) for the maximum permissible air charge of the combustion chamber in dependence upon functions of said engine; and, determining a desired value (as1) for the air charge in said combustion chamber which prevents the two desired values (rlmd$s, rlmx$s) from being exceeded.

16. The method of claim 15, comprising the further step of executing a minimal value selection in which at least said desired value (rlmd$s) and said desired value (rlmx$s) participate.

17. A control element for a control apparatus of an internal combustion engine including an engine for a motor vehicle, said control element comprising a program stored thereon which can be run on a computing apparatus including a microprocessor for carrying out a method including the steps of injecting fuel into the combustion chamber in at least two operating modes and switching between the operating modes; determining a desired value (rlmd$s) for the air charge in said combustion chamber with said desired value (rlmd$s) defining a maximum value for the air charge in said combustion chamber which may not be exceeded; and, determining a desired value (rlmx$s) for the maximum permissible air charge of the combustion chamber in dependence upon functions of said engine.

18. An internal combustion engine including an engine for a motor vehicle, the engine comprising:

a combustion chamber;

means for injecting fuel into said combustion chamber in at least two operating modes;

a control apparatus for switching between said operating modes; and, said control apparatus being configured to determine a desired value (rlmd$s) for the air charge in said combustion chamber with said desired value (rlmd$s) defining a maximum value for the air charge in said combustion chamber which may not be exceeded; and, said control apparatus being further configured to determine a desired value (rlmx$s) for the maximum permissible air charge of the combustion chamber in dependence upon functions of said engine.

* * * * *